F. H. RICHARDS.
MEANS FOR IMPARTING A MOVEMENT TO TYPE BARS OR TYPE BAR BLANKS.
APPLICATION FILED JAN. 21, 1901. RENEWED MAR. 10, 1909.

919,235.

Patented Apr. 20, 1909.
2 SHEETS—SHEET 1.

Witnesses:—
F. C. Fluedner.
F. N. Haviland.

Inventor,
F. H. Richards.

THE NORRIS PETERS CO., WASHINGTON, D. C.

F. H. RICHARDS.
MEANS FOR IMPARTING A MOVEMENT TO TYPE BARS OR TYPE BAR BLANKS.
APPLICATION FILED JAN. 21, 1901. RENEWED MAR. 10, 1909.
919,235.
Patented Apr. 20, 1909.
2 SHEETS—SHEET 2.
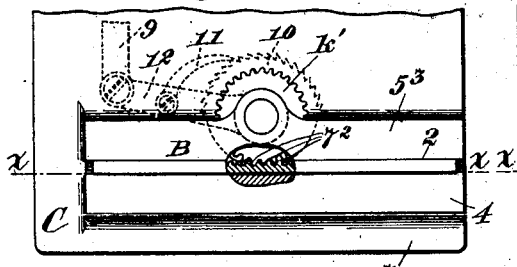
Fig. 7.
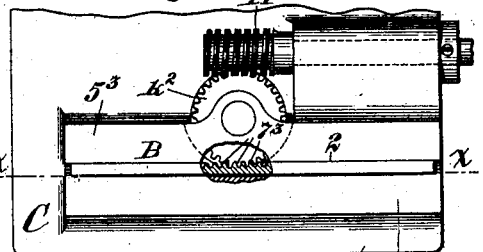
Fig. 10.
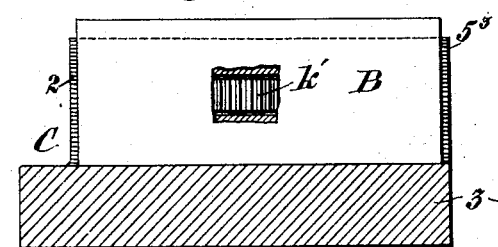
Fig. 8.
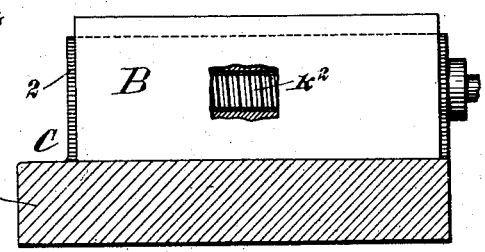
Fig. 11.
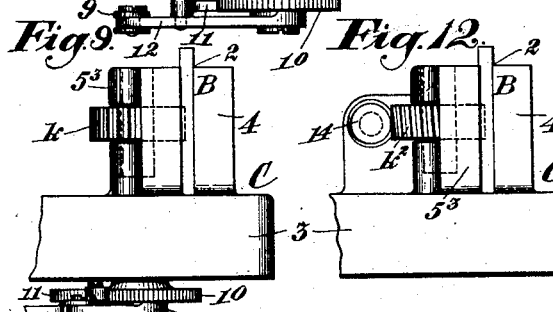
Fig. 9. Fig. 13.
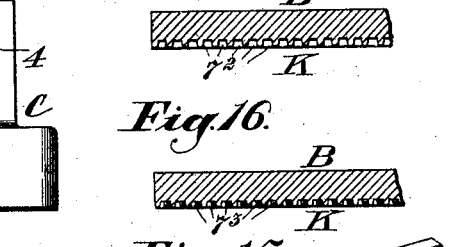
Fig. 12.
Fig. 14.
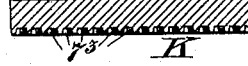
Fig. 16.
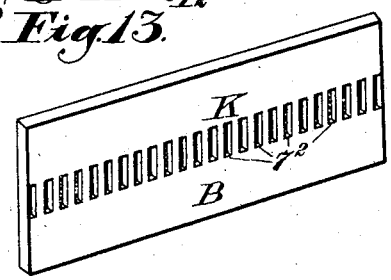
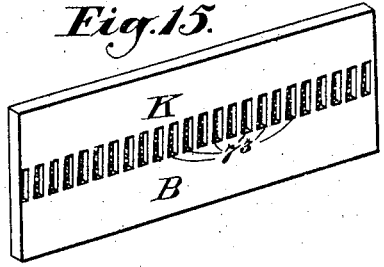
Fig. 15.
Witnesses:—
F. C. Fliedner.
F. H. Harland.
Inventor,
F. H. Richards.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

MEANS FOR IMPARTING A MOVEMENT TO TYPE-BARS OR TYPE-BAR BLANKS.

No. 919,235.           Specification of Letters Patent.        Patented April 20, 1909.

Application filed January 21, 1901, Serial No. 44,111. Renewed March 10, 1909. Serial No. 482,568.

*To all whom it may concern:*

Be it known that I, FRANCIS H. RICHARDS, a citizen of the United States, residing at Hartford, in the county of Hartford and State of Connecticut, have invented certain new and useful Improvements in Means for Imparting a Movement to Type-Bars or Type-Bar Blanks, of which the following is a specification.

This invention relates to means for imparting a movement to a typebar or a typebar-blank.

It is an object of the present invention to provide means whereby a typebar or typebar-blank may be actuated for the purpose, for instance, of bringing different portions of the same into proper relation to one or more type-making instrumentalities during the course of the conversion of the blank into a typebar.

Figure 1:
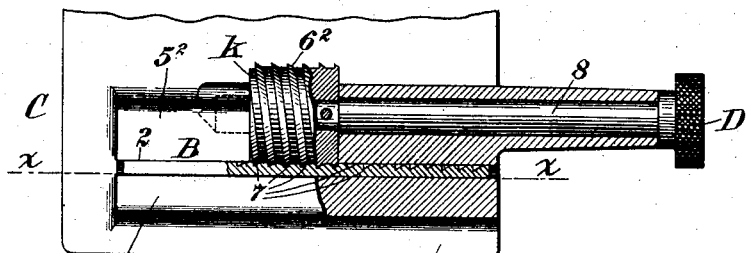
Figure 2:
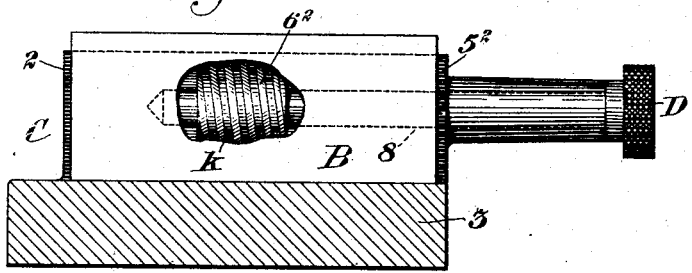
Figure 4:
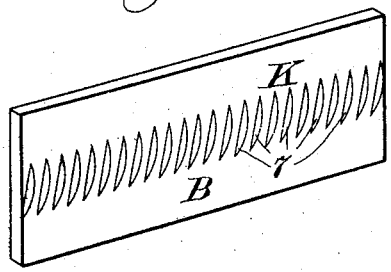
Figure 5:
Figure 3:
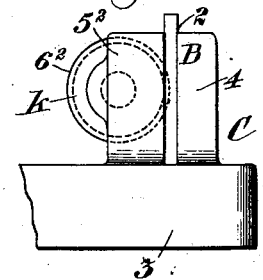
Figure 6:
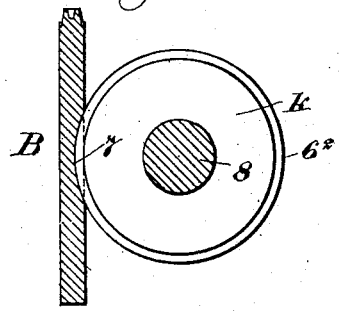

An embodiment of the present invention is represented in the drawings accompanying the present specification, and in these drawings Figure 1 is partly a plan view and partly a longitudinal section illustrative of one form of such embodiment. Fig. 2 is a section on the plane of the line $x$—$x$, in Fig. 1, certain parts being broken away to show parts lying beyond. Fig. 3 is an end elevation of the device as shown in Fig. 1, looking toward the right-hand in that figure. Fig. 4 is a perspective view on a somewhat different scale of the typebar-blank represented in Figs. 1, 2, and 3. Fig. 5 is a longitudinal section on an enlarged scale of a portion of the typebar-blank represented in Fig. 4. Fig. 6 is a cross section on a somewhat enlarged scale of a typebar and its actuator. Figs. 7, 8, and 9 are views corresponding, respectively, to Figs. 1, 2, and 3, and represent a modification. Figs. 10, 11, and 12 are also similar views to Figs. 1, 2, and 3 and represent still another modification. Fig. 13 is a perspective view of the typebar-blank represented in Figs. 7, 8, and 9. Fig. 14 is a longitudinal section on a somewhat enlarged scale of a portion of the typebar-blank represented in Fig. 13. Fig. 15 is a perspective view of the typebar-blank represented in Figs. 10, 11, and 12. Fig. 16 is a longitudinal section on a somewhat enlarged scale of a portion of the typebar-blank represented in Figs. 10, 11, and 12.

Similar characters of reference designate corresponding parts in all the figures of the drawings.

Referring at first to that form set forth in Figs. 1 to 6, inclusive, the typebar-blank, designated in a general way by B, is adapted to move lengthwise through a slot 2 in a suitable holder. This holder is here represented in a conventional way, as suggestive of the purposes fulfilled by the corresponding feature in the actual typebar machine, viz., as a support and guide for the movable typebar or typebar-blank. This holder, designated generally by C, comprises, in the present representation thereof, a base-plate or block 3 provided with uprights 4 and $5^2$, forming between them the beforementioned slot 2. For the attainment of the lengthwise motion of the blank through the slot 2, I provide the blank with a series of shoulders adapted to coact with an appropriate actuator, designated generally by K, for moving the blank. These shoulders may be fixed relatively to the blank in any desired manner, for instance, by forming them in the substance of the blank or upon a separate piece attached to the blank. When disposed upon the side face of the blank, however, their tops preferably will not extend beyond the plane of the face the better to enable the blanks and typebars formed from such blanks to be closely assembled. I find it convenient to form these shoulders by providing the blank with a series of notches. Such notches may be located in one of the side faces of the blank, and each notch is of a depth and of a length sufficient to provide an ample shoulder with which the actuator may contact. In Figs. 1 to 3 and Fig. 6 (in which latter figure the blank is represented with type upon its edge to form a typebar) an actuator for engaging with the notches 7 is represented in the form of a screw $k$ or member having a helical surface $6^2$, suitable for engagement with the shoulders formed by the notches in the blank and entering the slot in the holder for this purpose. The angle of these notches preferably corresponds approximately to the pitch of the screw which forms the actuator. This screw $k$ is located in a suitable position to engage with the notches, and is shown in Figs. 1, 2, and 3 supported in an opening in the upright $5^2$. Its shaft 8 may be driven in any desired manner from the machine operating to convert the blank into a typebar, or otherwise. In Figs. 1 and 2 this shaft 8 is shown provided with a thumb-piece D, but of course it is understood that this particular feature is representative only. It is plain that a rotary motion imparted to the shaft 8 will cause a lengthwise movement, intermittent or otherwise, of the blank B with which the actuator is in engagement.

Referring now to the remaining figures, the holder C for the blank B is represented in a similar conventional way embodying a baseplate or block 3, as before, provided with a similar upright 4.

In the form represented in Figs. 7, 8, and 9 the actuator consists of a spur-wheel $k'$, mounted in an upright $5^3$, to permit its teeth to enter the slot in the holder and engage with the notches $7^2$ in the blank B. In these figures, also, a device is shown for imparting an intermittent forward movement to the blank by the motion of a reciprocating member 9, which comprises, as shown, a ratchet-wheel 10 rigid with the spur-wheel $k'$. With this ratchet-wheel 10 is adapted to engage a pawl 11 supported upon a vibratory pawl-arm 12 hinged to the reciprocating member 9. It is evident that upon a reciprocation of the member an intermittent forward motion will be given to the blank.

In the modification set forth in Figs. 10 and 11 the actuator consists of worm-wheel $k^2$ mounted in an upright $5^3$ of the holder to enter the slot and engage with the notches $7^3$ upon the typebar-blank located in the slot. The inclination of the notches on the blank preferably correspond to the pitch of the worm-wheel, and the latter may be driven by a worm 14, suitably mounted in any desired manner, as already explained with reference to the preceding figures. It is contemplated that, ordinarily, the notches will be of such form as that each notch shall present oppositely facing shoulders; hence if the notches are of the proper width the actuator will coöperate with the shoulders facing in one direction to move the blank forward, while the shoulders facing in the opposite direction operate to lock the blank against movement after adjustment.

In using the term "typebar-blank", I wish to include also a typebar and a bar or blank in any intermediate stage of its conversion from a blank to a finished typebar. Such a combination—that is, of a notched typebar-blank and an actuator is shown in an application, Serial No. 49692, filed by me on the 5th day of March, 1901, renewed on the 10th day of March, 1909, Serial No. 482,569.

Having described my invention, I claim—

1. The combination with a support for sustaining and guiding a typebar-blank, of an actuator for engaging shoulders upon a blank in said support and moving the blank forward letter space distances and for engaging oppositely facing shoulders on the blank for, in conjunction with the first named shoulders, holding the blank against movement after adjustment.

2. The combination with a holder provided with a slot for receiving a type-bar blank, of a gear wheel mounted upon the holder and having a portion of its perimeter entering said slot for engaging preformed shoulders upon a blank in said slot, and means for rotating the wheel step by step for advancing the blank letter space distances.

3. The combination with a holder provided with a slot for receiving a type-bar blank, of a gear wheel mounted upon the holder and having its teeth entering said slot for engaging preformed faces upon a blank in said slot, and means for intermittently rotating the wheel for advancing the blank letter space distances.

4. The combination with a holder provided with a slot for receiving a typebar blank, of a rotary actuator carried by the said holder and entering the said slot for engaging pre-formed faces upon a blank therein, and means for intermittently rotating the actuator for advancing the blank letter space distances.

5. The combination with a holder provided with a slot for receiving a typebar blank, of an intermittently movable actuator carried by the holder and having a portion entering said slot and provided with faces for engaging shoulders on a blank in said slot for advancing the blank upon the movement of the actuator and for holding the same from backward movement upon the cessation of movement of the actuator and provided with faces for engaging shoulders on the blank for preventing advance movement of the blank upon the cessation of movement of the actuator.

6. The combination with a typebar blank provided in one of its faces with a series of oppositely facing shoulders, of an actuator adapted for engaging shoulders from both series, those shoulders facing in one direction coöperating with said actuator to move the blank forward and those shoulders facing in the opposite direction coöperating with the first mentioned shoulders and said actuator to lock the blank against movement after adjustment.

FRANCIS H. RICHARDS.

Witnesses:
FRED. J. DOLE,
C. E. VOSS.